United States Patent [19]
Long

[11] Patent Number: 6,095,017
[45] Date of Patent: Aug. 1, 2000

[54] KIND OF DISH TYPE BRAKE CYLINDER ADJUSTMENT DEVICE

[76] Inventor: Shu Yung Long, P.O. Box 63-150, Taichung City, Taiwan

[21] Appl. No.: 09/252,650

[22] Filed: Feb. 19, 1999

[51] Int. Cl.⁷ .................................................. B25B 13/48
[52] U.S. Cl. ........................................ 81/176.15; 81/461
[58] Field of Search ............................. 81/176.15, 176.1, 81/461

[56] References Cited

U.S. PATENT DOCUMENTS

| | | | |
|---|---|---|---|
| 3,815,209 | 6/1974 | Basile | 29/240 |
| 4,831,904 | 5/1989 | Agins | 81/176 |
| 5,279,192 | 1/1994 | Hartman | 82/112 |
| 5,845,552 | 12/1998 | Piascik | 81/461 |

*Primary Examiner*—David A. Scherbel
*Assistant Examiner*—Hadi Shakeri

[57] ABSTRACT

This original work is to provide a dish type brake cylinder adjustment device improved structure. It includes a pulling disc and a driving wrench; the center of the disc surface of the entire pulling disc and protruding upwards has a position fixing shaft with hollow center and in a round pole shape. In the two ends of the diameter of that position fixing shaft there is one concave connecting hole. The end surface of the perimeter predetermined radius has at least one indented positioning hole to provide a positioning pole for positioning the shaft. That driving wrench is manual rotation shaft driving. The end of the shaft direction has a driving disc. The center of that driving disc has receiving concave part, in the middle there is a strong magnet. The perimeter of that receiving concave part correspond to the connecting hole position of that driving disc and protruding upwards there are two position fixing protruding pole to provide rapid attracting attachment to connect to that pulling disc. From this it should base on the shaft positioning of that pulling disc to directly insert into a brake cylinder center valve opening and use the predetermined corresponding position fixing pole to connect the broken opening of the side end of that brake cylinder so that it can achieve the result of convenient disassembling of brake cylinder.

1 Claim, 3 Drawing Sheets

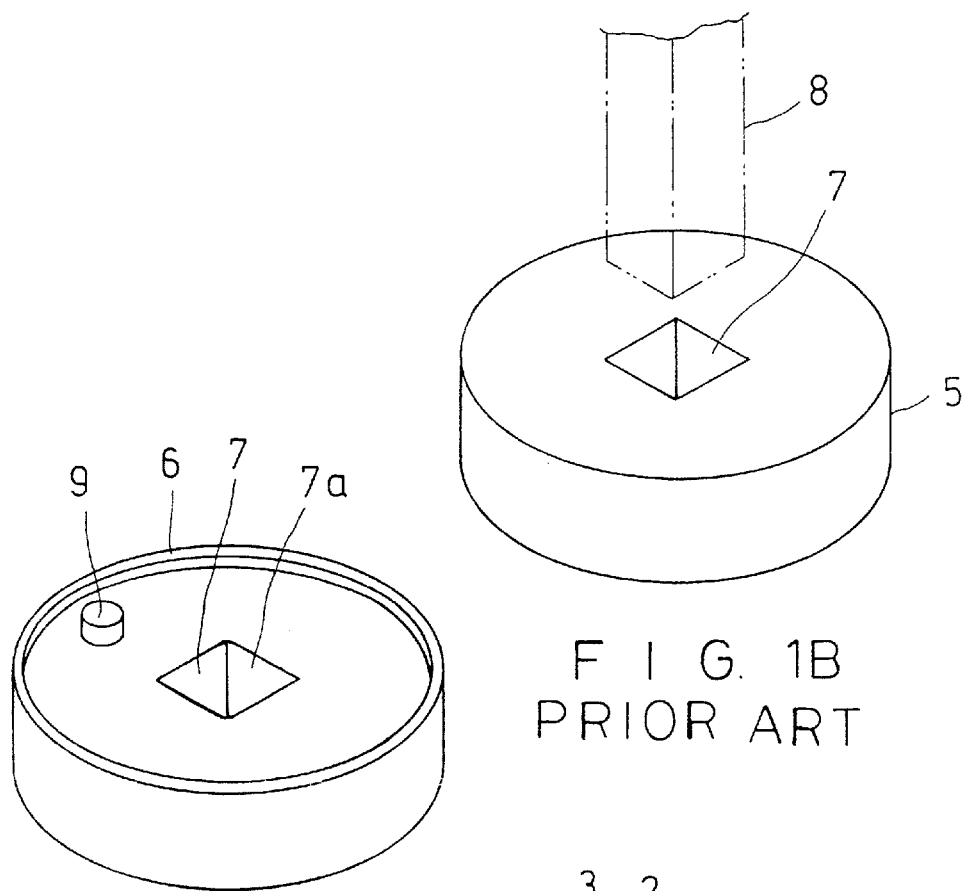
FIG. 1B
PRIOR ART
FIG. 1C
PRIOR ART
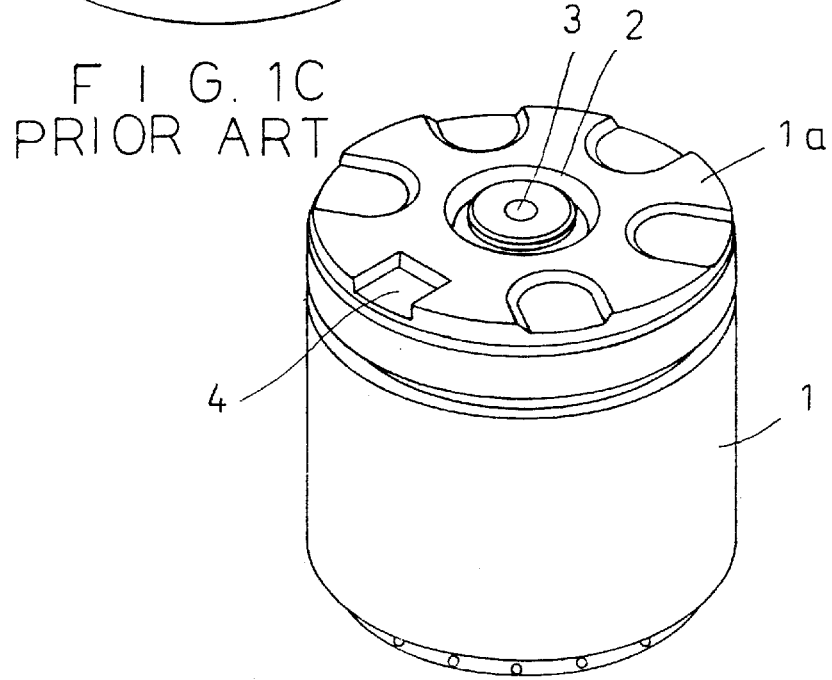
FIG. 1A
PRIOR ART 6,095,017

KIND OF DISH TYPE BRAKE CYLINDER ADJUSTMENT DEVICE

BLACKGROUND OF THE INVENTION

This original work is related to brake cylinder adjustment device. In detail, it is a improved structure of a kind of dish type brake cylinder adjustment device.

According to previously known brake cylinder often used in the transport vehicle as indicated by FIG. 1A, the brake cylinder (1), apart from a lower concave round shape a center valve opening is in the center to provide a control valve (3) in the middle and apart from the top side end (1a) there is an concave indenture (4), and due to consideration of its function the design requires it to maintain the outer appearance of an almost round smooth shape structure. Therefore in mechanical maintenance work general tool cannot be used to clamp it to disassemble to adjust and must require a special driving wrench (such as U.S. Pat. No. 5,003,681). As indicated in FIGS. 1B and 1C, that driving wrench (5) has a pair of disc surface (5a) and its perimeter is equivalent to that brake cylinder (1). Furthermore the perimeter of the disc surface (5a) extension has a belt shape perimeter wall (6) that covers the perimeter of that brake cylinder (1). The center of the disc surface (5a) has an concave square shaft hole (7) to cope with the shaft turning operation of the driving head (8) of a driving wrench That disc (5a) matches the concave part of that brake cylinder (1) top side end surface has a protruding driving pole (9) so that it can match with the concave part (4) to conduct the driving; as the inner diameter of the belt shape perimeter wall (6) requires to match with the maximum outer diameter of the brake cylinder (1), therefore when encountering different brand with different diameter brake cylinder, another set of new driving wrench (5) which can adapt to all sizes must be purchased. Otherwise it will be racing and can not be used. Therefore user has to bear burden of large cost and problems for repair and maintenance industries; Besides, between the driving socket wrench and driving wrench they lack the guarantee effective positioning.

It only relies on the matching method of a single square shaft hole (7) and the driving head of the driving wrench. However, the side (7a) of the coupling drive can be directly suffered from wear and tear and the hole opening will be enlarged causing easy sliding. Then added together there is the operating environment of lubricating oil on all side, therefore to obtain a quick and more convenient brake cylinder disassemble adjustment effect is not easy and it also cause very big problem for the industries.

In view of this, the creator based on years of experience of manufacturing and sales of similar product and conducted continues research and testing and finally a practical original work is born.

SUMMARY OF THE INVENTION

The main purpose of this original work is to provide an improved structure of dish type brake cylinder adjustment device so that it can greatly enhance the efficiency of brake cylinder adjustment operation and can also adapt to the operation area of different diameter of different brand.

According to this original work of a kind of improved structure of dish brake pump adjustment device it consist of a pulling disc body which can provide the shaft connection of the brake cylinder and a driving wrench which can connect with that pulling disc body to rotate the shaft. The characteristics are: In the center of the disc surface of the pulling disc body which is facing upwards establish a center hollow pole shape convex position fixing shaft part. The diameter of that position fixing shaft part should match with the inner diameter of the center valve opening of that brake cylinder. The position of the two ends of its diameter will set one connecting concave hole separately and the end surface of its perimeter's predetermined radius should set at least one position fixing concave hole to provide shaft positioning for a positioning pole. There is a driving disc on the end of the shaft direction of the driving wrench and in the center of that driving disc there is a accepted concave part. And in there is a strong magnet. The position of the connecting hole of that wrench disc body matches the perimeter of the concave accepting part so as to quickly attract and attach to the wrench disc body. From this that positioning shaft part should point and insert into the center valve opening of that brake cylinder. Also with predetermined corresponding positioning pole to stop another indenture in the side of the brake cylinder causing brake cylinder to be quickly adjusted and disassembled which is convenient and solid.

In order to enable your examination committee member to have more concrete understanding of the purpose, special characteristics and advantages of this original work, the followings are better implementation samples with matching Figures to describe:

BRIEF DESCRIPTION OF THE DRAWINGS

FIG. 1A is the explanation diagram for brake cylinder and driving socket structure FIGS. 1B and 1C show schematic views of a driving socket disclosed in the U.S. Pat. No. 5,003,681

Figure 2:
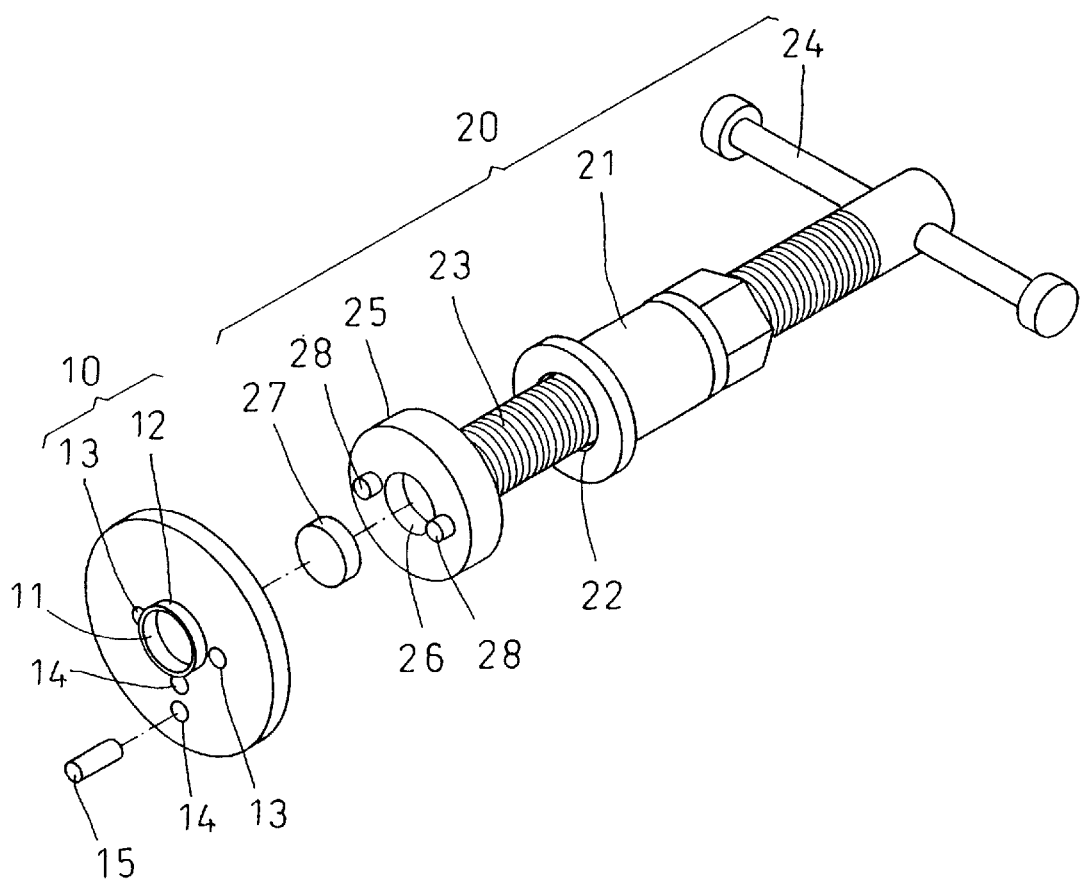
FIG. 2 is the analytical three dimensional diagram of a better implementation example of this original work

DESCRIPTION OF NUMBERS IN THE FIGURE (1) brake cylinder
(1a) Top side end surface
(2) Center valve opening
(2a) Depth
(3) Control valve body
(4) Indenture concave part
(5) Driven socket
(5a) Disc surface
(6) Belt shape perimeter wall
(7) Shaft hole
(7a) Side
(8) Driving head
(9) Driving pole
(10) Pulling disc body
(11) Positioning shaft part
(12) Height
(13) Connecting hole
(14) Positioning hole
(15) Positioning pole
(20) Driving wrench
(21) Positioning adapter
(22) Threaded hole
(23) Threaded lever

(24) Holding lever
(25) Driving disc
(26) Accepting concave part
(27) Magnet
(28) Fixing convex pole

DETAILED DESCRIPTION OF THE INVENTION

Figure 3:
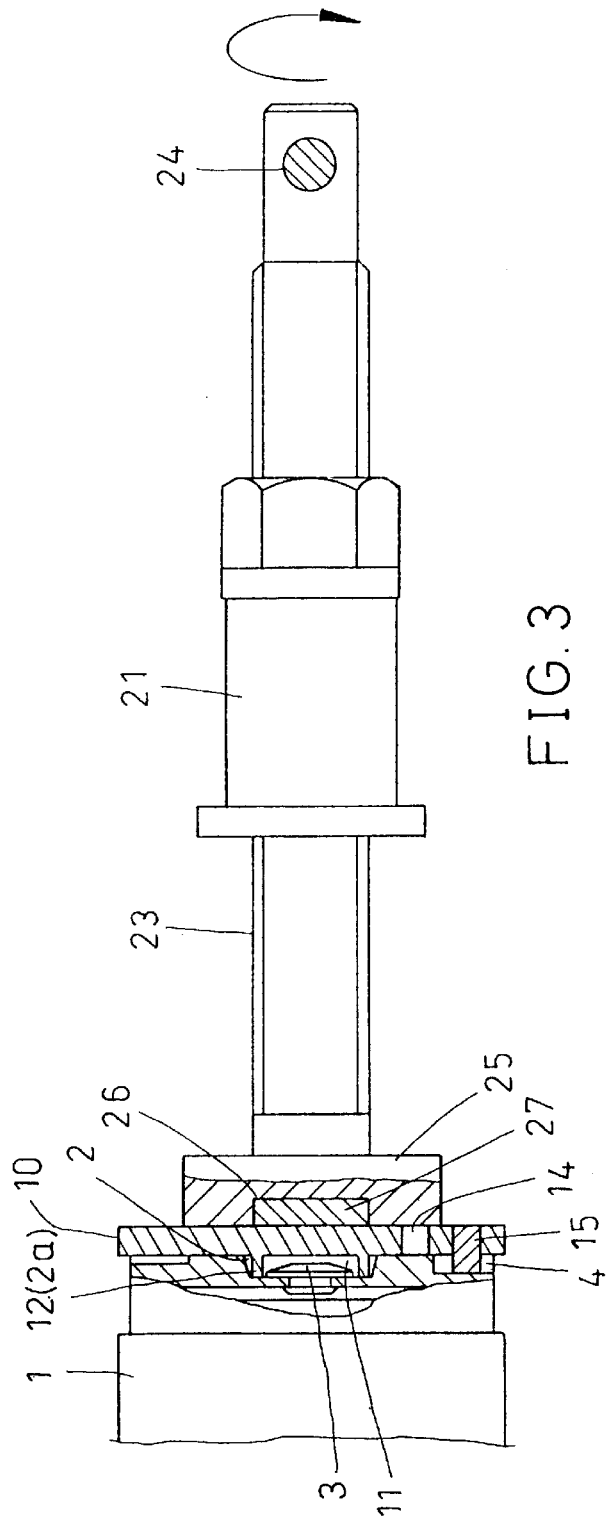
FIG. 3 is an assembly perspective drawing of a better implementation example of this original work
Figure 4:
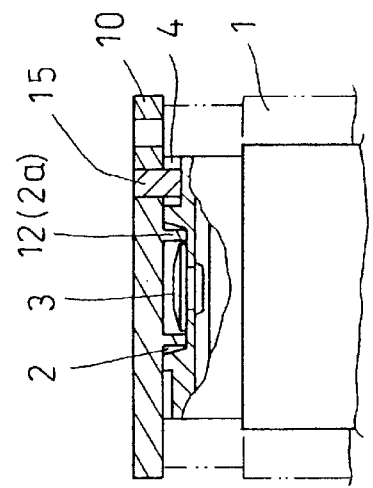
FIG. 4 is the explanation diagram of combination of the pulling disc body and the brake cylinder

First, please refer to FIGS. 1–3. This original work is an improvement structure of a kind of dish brake cylinder adjustment device. It consists of a pulling disc body (10) which can provide for connection with shaft direction to the brake cylinder (1) and a driving wrench (20) which can connect to that pulling disc body (10) to rotate the shaft; in there the center of the disc surface of that pulling disc body (10) has a hollow prosected positioning shaft (11) facing upwards. The perimeter of that positioning shaft (11) matches the inner diameter of the center valve opening (2) of that brake cylinder (1). As indicated in FIGS. 3 and 4, the height of the center positioning shaft (11) of that pulling disc body (10) is best to be equivalent to the depth (2a) of the center valve opening (2) of that pulling disc body (1) so that the corresponding shaft can match the inner diameter of that center valve opening (2) and the side of that control valve body (3). The location of the two ends of its diameter will have one connecting hole separately and in the end surface of its predetermined radius of its perimeter there will be at least one concave positioning hole (14) in order to provide shaft positioning of the positioning pole (15).

Figure 5:
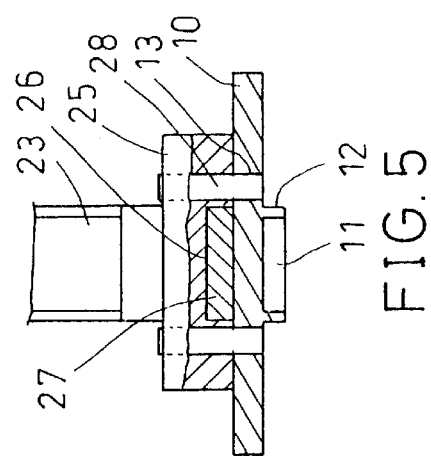
FIG. 5 is the explanation diagram of combination of the pulling disc body and the driving wrench

That driving wrench (20) includes a positioning adapter (21) which is hollow in the center. That shaft direction of that positioning adapter (21) has a threaded hole (22) and in the screw connection there is a threaded lever (23) for that threaded hole (22) to rotate and to turn the shaft. The front end of that threaded lever (23) has a holding lever (24) and its end vertically has a driving disc (25) and in the center convex part of that driving disc (25) there is a center hole (26). Also there will be a strong magnet (27). The perimeter of the center hole (26) correspond to the position of the connecting hole (13) of that pulling disc body (10) has two fixing pole (28) facing upwards which is to provide corresponding shaft to enter into the two connecting hole (13) of that pulling disc body (10). As indicated in FIG. 5, the magnet (27) in the center hole (26) is to attract and attach on the end surface of that pulling disc body (10).

Based on the assembly described above the original work of improved structure of a kind dish brake cylinder adjustment device can be obtained. As indicated in FIG. 2 to 5, as the widened horizontal end surface on the perimeter side of the pulling disc body (10) of this original work provides a outer perimeter without blockage connecting environment and also in the center of the end shaft, based on the height (12) of the positioning shaft (11) to provide the center valve opening (2) of the brake cylinder (1) a positioning standard of center position shaft connection. At the same time, coping with the pulling disc body (10) the surface of each shaft positioning pole (15) on the position hole (14) which cope with the dimension and position of the brake cylinder and corresponding stop in the indented concave part (4) of the top side end surface (14) enabling that it can adapt to brake cylinder of different brand. From this it will reduce the previous practice of continuous additional purchase of tool and new product. In addition, the combination of the pulling disc body (10) and driving wrench (20) of this original work is the method of correcting matching center square hole of previous practice. By using the connecting hole (13) at the two end position of its diameter of the wrench disc body to cope with the two fixing pole (28) of the shaft pole of the driving wrench (20) and the attracting attach function of the strong magnet (27) set at the center hole (26) will obtain the best diameter direction insert combination driving capability. In the operation process, not only it is very tight and strong which will not slide off easily, in the assembly part, due to the guidance of the fixing pole (28) and the attracting attachment function of the magnet (27) it will be much quicker and more convenient.

What is claimed is:

1. A disk brake cylinder adjustment device comprising a pulling disc body for connecting to the brake cylinder, and a driving wrench for connecting to said pulling disc body, said pulling disc body being provided in the center thereof with a hollow projected positioning shaft which has an outer diameter corresponding to an inner diameter of a center valve opening of the brake cylinder, said pulling disc body being provided at both ends of a diameter thereof with a connecting hole, said pulling disc body further provided on an end surface of a predetermined radius of an outer perimeter thereof with a positioning pole, said driving wrench being provided at an end of the shaft direction thereof with a driving disc which is provided in the center thereof with a center hole and heavy-duty magnet disposed in said center hole, said pulling disc body being provided in a perimeter thereof with two fixing poles corresponding in location to the connecting holes of said pulling disc body, said positioning shaft being fitted into the center valve opening of the brake cylinder such that the positioning pole urges an indentation of the brake cylinder; wherein the height of said positioning shaft of said pulling disc body is equal to the depth of the center valve opening of the brake cylinder.

* * * * *